United States Patent
Pancholi et al.

(10) Patent No.: US 9,385,587 B2
(45) Date of Patent: Jul. 5, 2016

(54) CONTROLLED START-UP OF A LINEAR VOLTAGE REGULATOR WHERE INPUT SUPPLY VOLTAGE IS HIGHER THAN DEVICE OPERATIONAL VOLTAGE

(71) Applicants: Deepak Pancholi, Bangalore (IN); Bhavin Odedara, Bangalore (IN); Rohit Reddy, Bangalore (IN)

(72) Inventors: Deepak Pancholi, Bangalore (IN); Bhavin Odedara, Bangalore (IN); Rohit Reddy, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 114 days.

(21) Appl. No.: 13/897,586

(22) Filed: May 20, 2013

(65) Prior Publication Data

US 2014/0266089 A1    Sep. 18, 2014

(30) Foreign Application Priority Data

Mar. 14, 2013 (IN) .......................... 1109/CHE/2013

(51) Int. Cl.
  *G05F 1/575*    (2006.01)
  *H02M 1/36*    (2007.01)
  *G05F 1/56*    (2006.01)

(52) U.S. Cl.
  CPC .. *H02M 1/36* (2013.01); *G05F 1/56* (2013.01)

(58) Field of Classification Search
  CPC ........... G05F 1/56; G05F 1/565; G05F 1/575; H02M 1/36; H02M 3/1584; H02M 2001/0032; H02M 2001/0045
  USPC .......................... 323/226, 268–274, 280, 281
  See application file for complete search history.

(56) References Cited

U.S. PATENT DOCUMENTS

| | | | |
|---|---|---|---|
| 5,917,313 A | 6/1999 | Callahan, Jr. | |
| 6,989,660 B2 | 1/2006 | Mauthe | |
| 7,355,867 B2 * | 4/2008 | Shuey | 363/56.11 |
| 7,956,589 B1 | 6/2011 | Fan | |
| 2007/0018623 A1 | 1/2007 | Lopata | |
| 2007/0296392 A1 * | 12/2007 | Chen | G05F 3/30 323/313 |
| 2009/0206813 A1 | 8/2009 | Agari et al. | |
| 2010/0052636 A1 | 3/2010 | Takagi et al. | |
| 2011/0018588 A1 | 1/2011 | Notman et al. | |
| 2011/0156672 A1 | 6/2011 | Gakhar et al. | |
| 2013/0141058 A1 * | 6/2013 | Kris | H02M 3/157 323/271 |
| 2014/0266089 A1 * | 9/2014 | Pancholi et al. | 323/268 |

FOREIGN PATENT DOCUMENTS

| | | | |
|---|---|---|---|
| EP | 0 987 615 A1 | 3/2000 | |
| EP | 2 120 123 A1 | 11/2009 | |
| EP | 2 317 413 A1 | 5/2011 | |
| JP | EP-0987615 A1 * | 9/1999 | ............. G05F 1/573 |
| WO | WO 03/085475 A2 | 10/2003 | |

OTHER PUBLICATIONS

International Search Report and Written Opinion of pending PCT Application No. PCT/US2014/023468 mailed Jul. 7, 2014.

* cited by examiner

*Primary Examiner* — Yemane Mehari
(74) *Attorney, Agent, or Firm* — Brinks Gilson & Lione (57) ABSTRACT

A controlled start-up circuit mechanism in a linear voltage regulator can handle a higher supply voltage at start-up and limits the voltage seen at the devices to be lower than the maximum allowed operation voltage. The circuit may regulate voltage for operating a device coupled to a host when the host supply exceeds that necessary for device operation. The controlled start-up mechanism handles a sudden ramp up or spike of supply voltage relative to the device's operational voltage.

15 Claims, 7 Drawing Sheets

CONTROLLED START-UP OF A LINEAR VOLTAGE REGULATOR WHERE INPUT SUPPLY VOLTAGE IS HIGHER THAN DEVICE OPERATIONAL VOLTAGE

PRIORITY CLAIM

This application relates claims priority to New Ordinary Indian Patent Application No. 1109/CHE/2013 filed on Mar. 14, 2013, entitled "CONTROLLED START-UP OF A LINEAR VOLTAGE REGULATOR", the entire disclosure of which is hereby incorporated by reference.

TECHNICAL FIELD

This application relates generally to a linear voltage regulator. More specifically, this application relates to improving a linear voltage regulator with a controlled start-up circuit mechanism that handles the input power supply when it is higher than a device's operational voltage.

BACKGROUND

As per Moore's law, advances in integrated circuit (IC) technologies have resulted in decreasing the size and operating voltages of devices used to fabricate circuitry. As process geometries are shrinking, the voltages required for support are also decreasing. For example, in CMOS 28 nm process, standard voltage core devices support 0.9V input supply voltage while preferred thick oxide devices in this process support 1.8V input supply. There is a trend of lower supply voltages for core and IO (thick oxide) devices.

In battery operated devices, such as cellular phones, smartphones, tablets, and laptop computers, low-voltage integrated circuits allow the devices to operate proportionally longer than devices requiring higher voltage for operation. The lower supply voltages of the latest standards (e.g. USB3.0, SATA3.0, PCIe3 etc.) may not always be compatible with legacy host device interfaces but new interfaces are typically backwards compatible. For example, old standard hosts provide higher supply voltage than new standards. Many interface standards are still supporting higher voltages, including 5V, 3.3V or 2.5V along with lower voltages (from host devices) for analog design or for maintaining compatibility with older interface standards. Accordingly, regulators need to translate 3.3V to 1.8V or 3.3V to 0.9V or lower with devices whose typical operational voltage is 1.8V or lower. Maximum possible support for these 1.8V devices can be up to 2V but not necessarily up to 3.7V or so.

The latest computer peripheral devices may therefore be designed to accommodate connections from newer, lower voltage host supplies as well as older, higher voltage supplies. Devices constructed with newer technologies therefore must allow for the possibility that the host device in which they are used may supply a higher voltage with legacy products. In order to couple systems manufactured with newer interface standard technologies to legacy interface standard hosts that provide higher-supply voltages, voltage regulation from higher voltage to lower voltage with devices whose operating voltage is lower than the input supply voltage may be used to provide the correct voltage in steady state. However, the voltage regulation may not adequately handle this higher than operational voltage at start-up.

SUMMARY

It may be desirable to have a voltage regulation circuit that regulates voltage with a controlled start-up mechanism for handling voltages that are higher than the device operation voltage. The start-up mechanism handles a higher start-up voltage and limits the voltage seen at the device to be lower than the maximum allowed operation voltage.

BRIEF DESCRIPTION OF THE PRESENTLY PREFERRED EMBODIMENTS

By way of introduction, a circuit, according to the embodiments described below, utilizes a start-up mechanism for regulating voltage. The circuit may regulate voltage for operating a device coupled to a host when the host supply exceeds that necessary device operational voltage. The controlled start-up mechanism handles a sudden ramp up of supply voltage (voltage spike) and handles very high voltages relative to the device's operational voltage. The circuit may be implemented with transistors or other devices which are designed to operate at various voltage levels which may be independent of the host. The circuit should be able to handle higher supply voltage of the host even if device operational voltage limit is lower. The circuit should also make sure that the devices or the host is not damaged under any condition The circuits described below may include a variety of different transistors including MOS transistors. Metal oxide semiconductor ("MOS") may refer to the physical structure of certain field effect transistors, having a metal gate electrode placed on top of an oxide insulator, which in turn is on top of a semiconductor material. Complementary metal oxide semiconductor ("CMOS") is a technology for constructing integrated circuits. CMOS may be used in a variety of digital logic circuits and may also be used in microprocessors, microcontrollers, static RAM, and memory devices, such as flash drives. CMOS technology may be used for analog circuitry, including image sensors, data converters, and/or transceivers for different types of communication. CMOS circuits may utilize p-type and n-type metal oxide semiconductor field-effect transistors ("MOSFETs") to implement logic gates and other digital circuits found in computing and signal processing equipment. Typical commercial CMOS products may be integrated circuits composed of millions of transistors of both types on silicon. These devices may be referred to as chips, die, or dies. CMOS circuits are used to implement logic gates with p-type and n-type MOSFETs to create paths to the output from either the voltage source or ground. When a path to the output is created from the voltage source, the circuit is said to be pulled up. The other circuit state occurs when a path to output is created from ground and the output pulled down to the ground potential. The devices or transistors used for the circuits below may include N-type metal oxide-semiconductor ("NMOS") or P-type metal oxide-semiconductor ("PMOS"). NMOS logic utilizes n-type metal oxide-semiconductor field effect transistors ("MOSFETs") to implement logic gates and other digital circuits. PMOS logic utilizes p-type MOSFETs to implement logic gates and other digital circuits.

Figure 7:
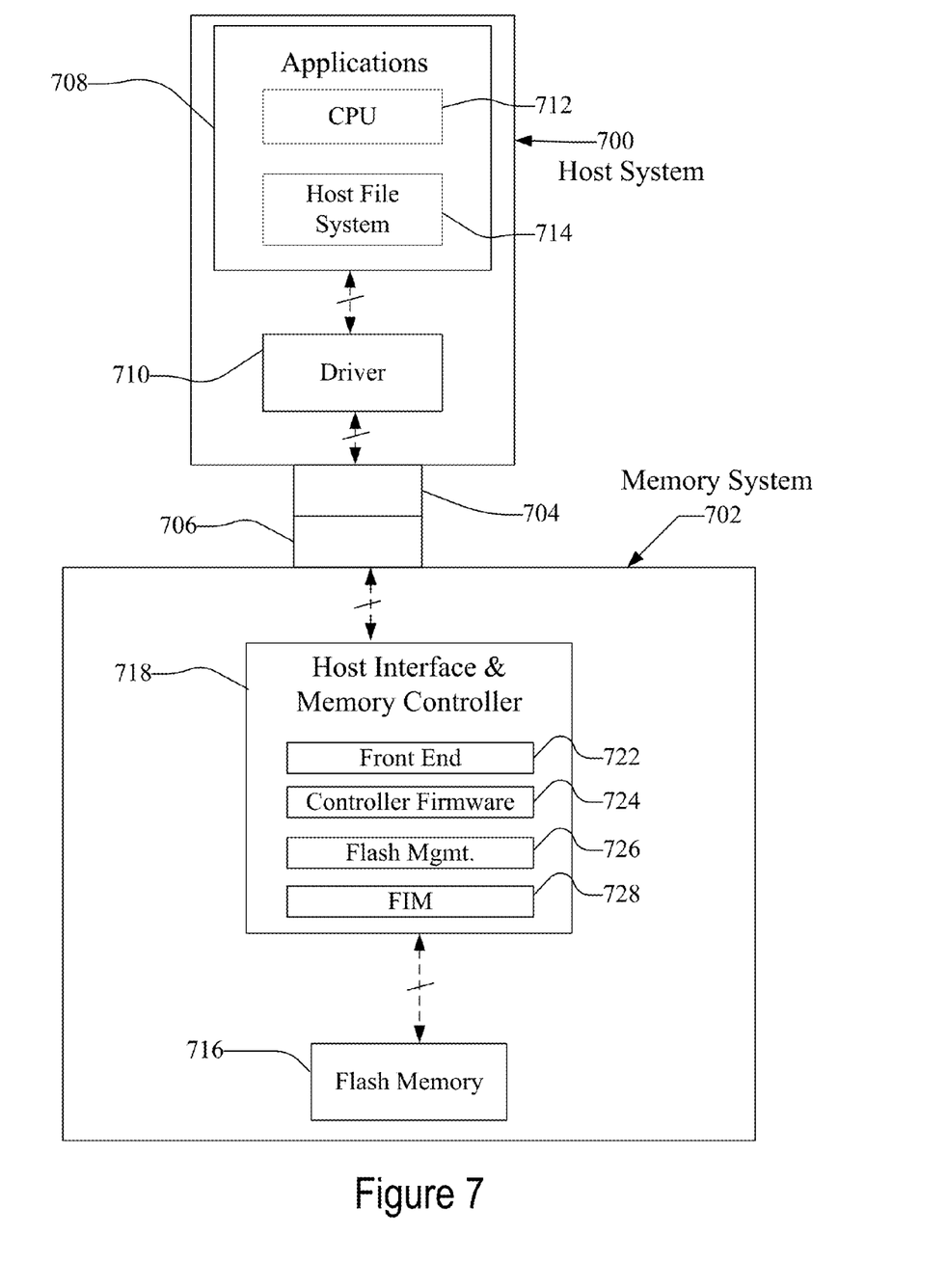
FIG. 7 is a block diagram of a host connected with a memory system having non-volatile memory.
Figure 8:
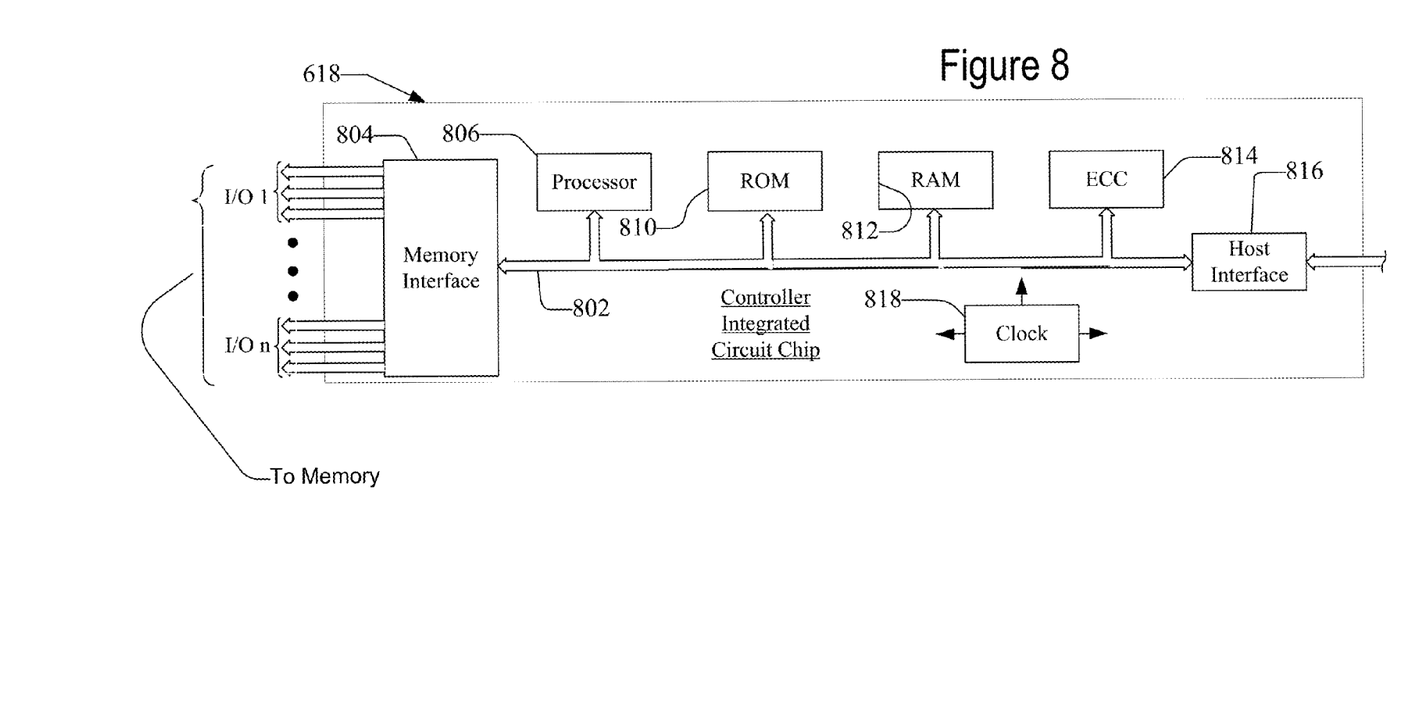
FIG. 8 is a block diagram of an exemplary flash memory system controller for use in the system of FIG. 7.

In one example, the circuit may be suitable for use with a non-volatile memory system as illustrated in FIGS. 7-8. However, the circuit may also apply to a number of different environments and uses other than the memory system illustrated in FIGS. 7-8. The system may be utilized with any number of types of host devices including cellular telephones, smartphones, digital cameras, personal digital assistants, mobile computing devices, tablets, laptops, netbooks, non-mobile computing devices, audio/mp3 players, video players, and other devices.

Figure 1:
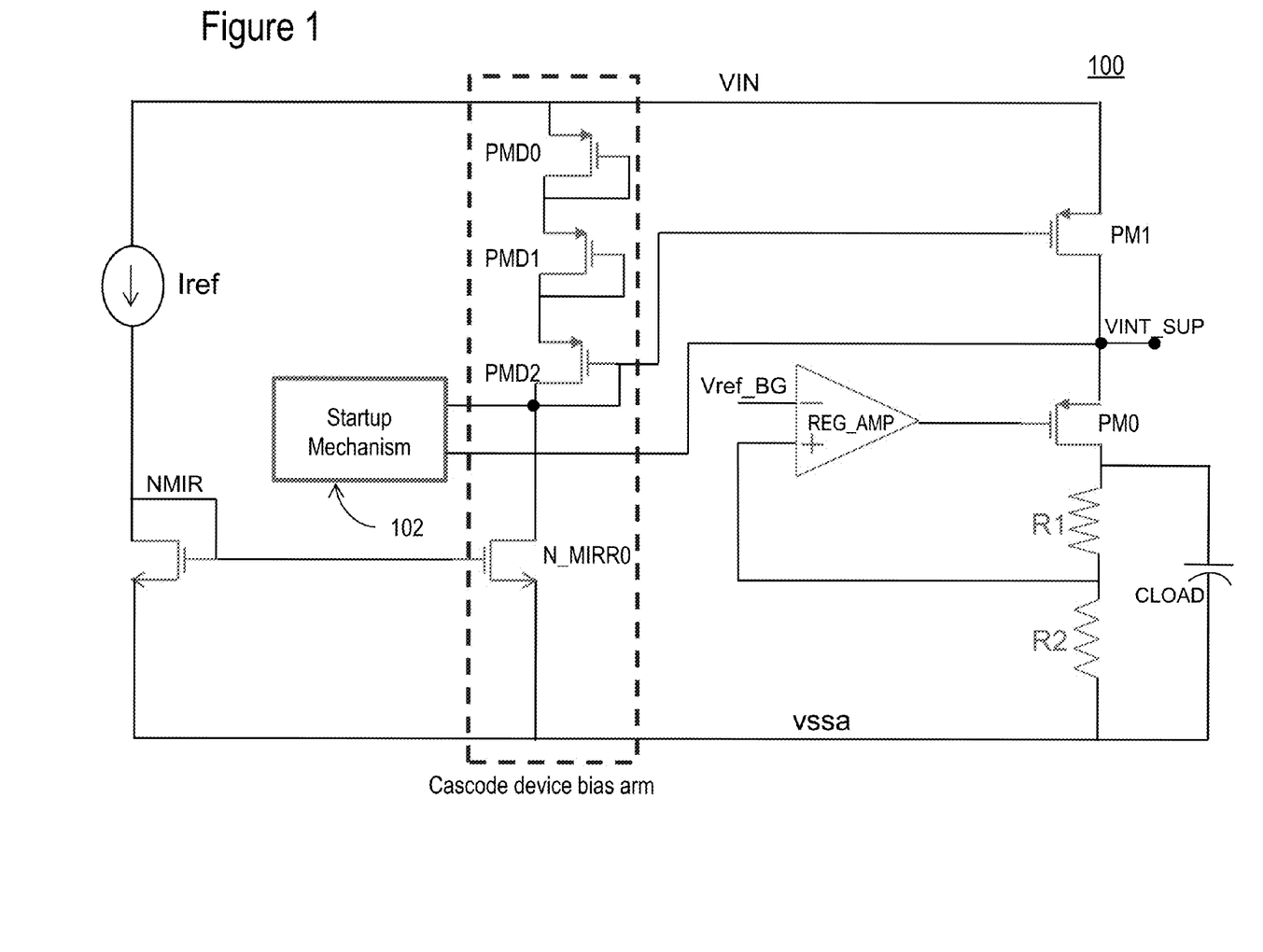
FIG. 1 is a controlled startup voltage regulator.
Figure 2:
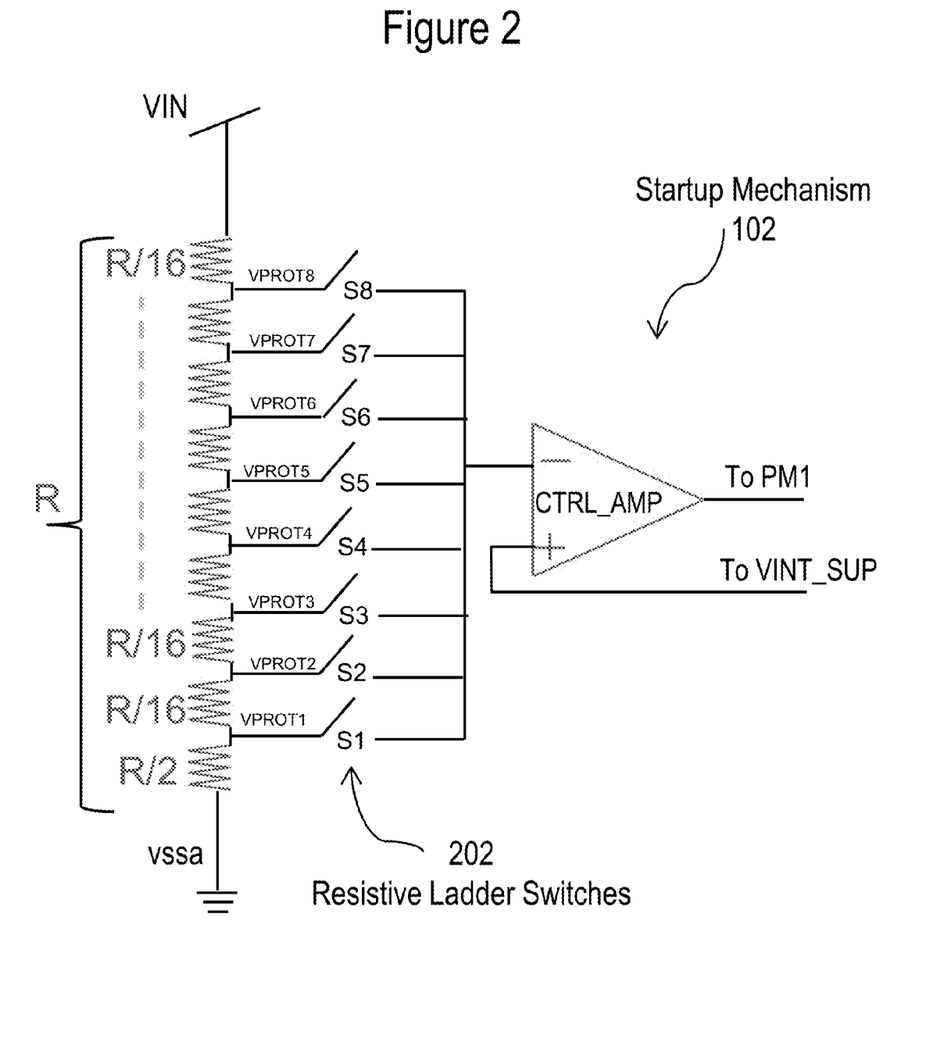
FIG. 2 is a startup mechanism for controlling input voltage.

FIG. 1 is a voltage regulator 100 with a controlled startup mechanism. PMOS PM1 generates an intermediate supply voltage (VINT_SUP) so that PMOS PM1 and PMOS PM0 are not exposed to a voltage higher than the maximum allowable operational voltage for the devices (e.g. 2V). PM1 may be a protection transistor and PM0 may be a regulating power MOS. The input voltage (VIN) may be established during start up. Without startup mechanism 102, VIN may rise quickly upon start-up and the voltage of VINT_SUP may not be controlled quickly enough which may expose pass MOS devices PM0 and PM1 to higher voltages than the operational voltages for those devices. When devices are subjected to voltages above the operational voltage that the device is designed for, it may burn or have a reduced life cycle. The startup mechanism 102 is included in the circuit to prevent the devices from being exposed to voltages above the operational voltage. The startup mechanism is illustrated in FIG. 2 and described below. When the circuit received an input supply (e.g. a flash drive connected with a host), that supply may rise quickly from 0 volts to 5 volts (in the flash drive example), but all the devices in the circuit may not be designed for that high of a voltage, so the startup mechanism 102 controls the intermediate supply voltage (VINT_SUP) which in turn slows down the initial spike or rising of the supply voltage to the main regulation circuit.

Figure 6:
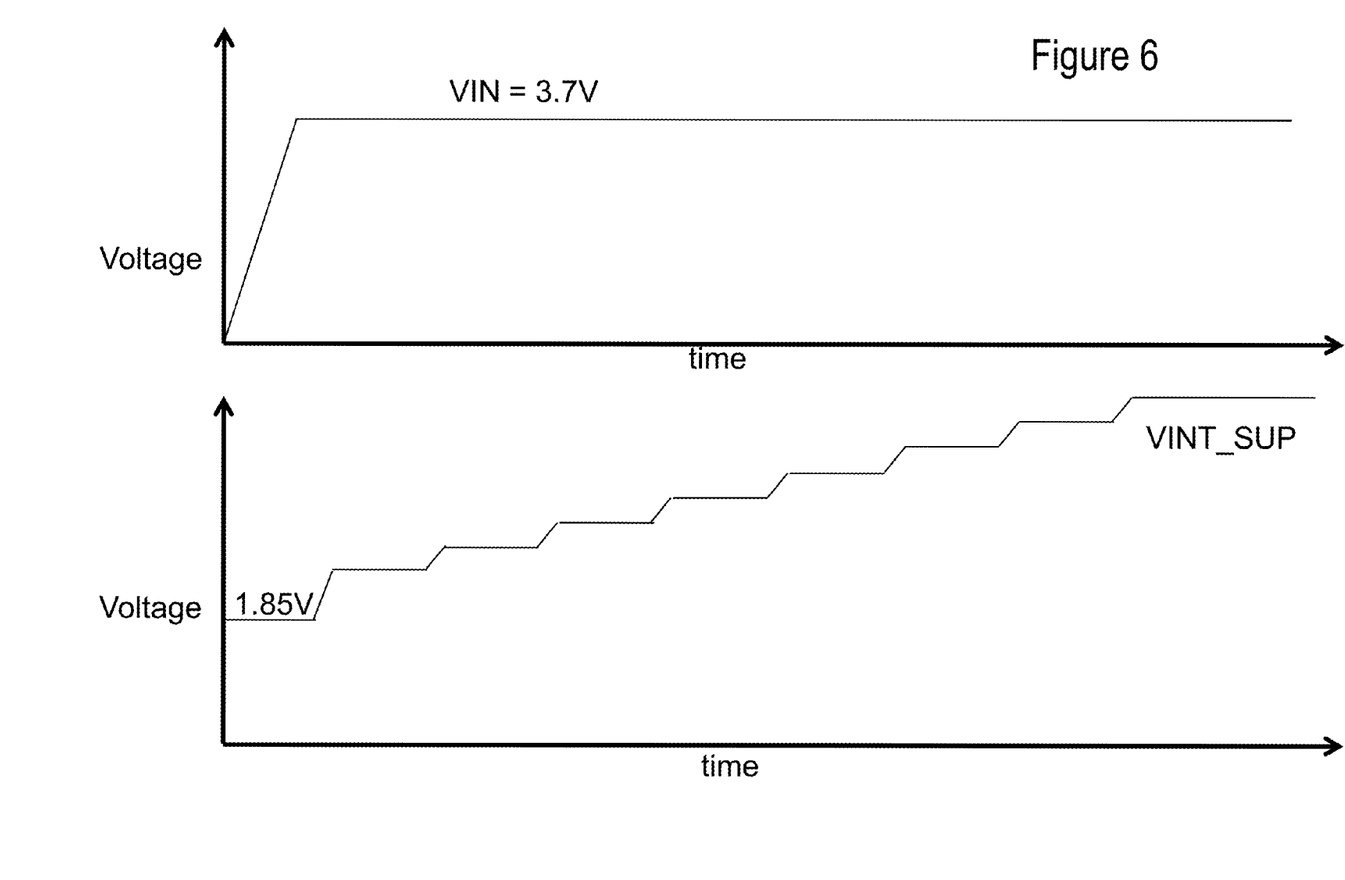
FIG. 6 is a graphical illustration of the controlled intermediate input supply voltage.

The amplifier REG_AMP regulates the voltage within the circuit. The Resistors R1 and R2 are shown with REG_AMP which receives a reference voltage Vref_BG. As the Cload capacitor gets charged, the output voltage rises and voltage across transistors PM1 and PM0 remain below device operational voltage (e.g. 2V). The simulation results of circuit and node voltages of VINT_SUP and VOUT are shown in FIG. 6.

The cascode or protection device bias arm may include the devices PMD0, PMD1, and PMD2, which are step devices for generating the bias voltage for cascode or protection device PM1, and includes a mirror device N_MIRR0. The devices PMD0, PMD1 and PMD2 may be used to create bias voltage for PM1 only after startup process is completed. In particular, the cascode or protection device bias arm creates a stable bias voltage for device PM1 in steady state condition after the supply ramp is settled. Whereas the startup mechanism 102 creates the bias voltage of PM1 as the supply is ramping up and before the supply ramp is settled. Accordingly, the devices which may have a lower operational voltage are not exposed to the higher voltage even during startup.

FIG. 2 is the startup mechanism 102 for controlling intermediate supply voltage. The resistive ladder switches 202 can modify the reference voltage of the error amplifier CTRL_AMP by switching on/off. As shown in FIG. 2, one embodiment may include eight resistive ladder switches, but more or fewer switches may be utilized in other embodiments. The resistors arm may be referred to as a resistor divider. The resistance values for the resistor divider that correspond to each of the switches are shown in FIG. 2 and are also exemplary. As shown switch S1 has a lower arm resistance value of R/2 or one half, while switches S2-S8 each have a lower arm resistance value of R/16 or one sixteenth. The voltages for each switch VPROT1-VPROT8 may thus be fixed. Based on the resistance values, the voltage at switch S1 may be the lowest.

The resistive ladder switches S1-S8 may create the reference voltage into the control amplifier CTRL_AMP. The node VINT_SUP may be controlled by amplifier CTRL_AMP. The CTRL_AMP may ensure that at startup the VINT_SUP is at 50% level of input power supply VIN. This results from the fact that one input of CTRL_AMP is at R/2 (when switch S1 is closed) from resistor ladder. With the startup mechanism 102, if the maximum input supply (VIN) is 3.7V, then the voltage at node VINT_SUP would be 1.85V. Assuming the device operation voltage is 2V, then the voltage at VINT_SUP is lower than the operation voltage. Every regular interval of time (in this example 10 uS) the switches are changed from S1 to S8 and this varies voltage at VINT_SUP in fixed voltage step (in this example, of 200 mV) as shown in FIG. 6 such that every device in the circuit experiences voltage across it below its maximum allowed operational voltage.

Figure 3:
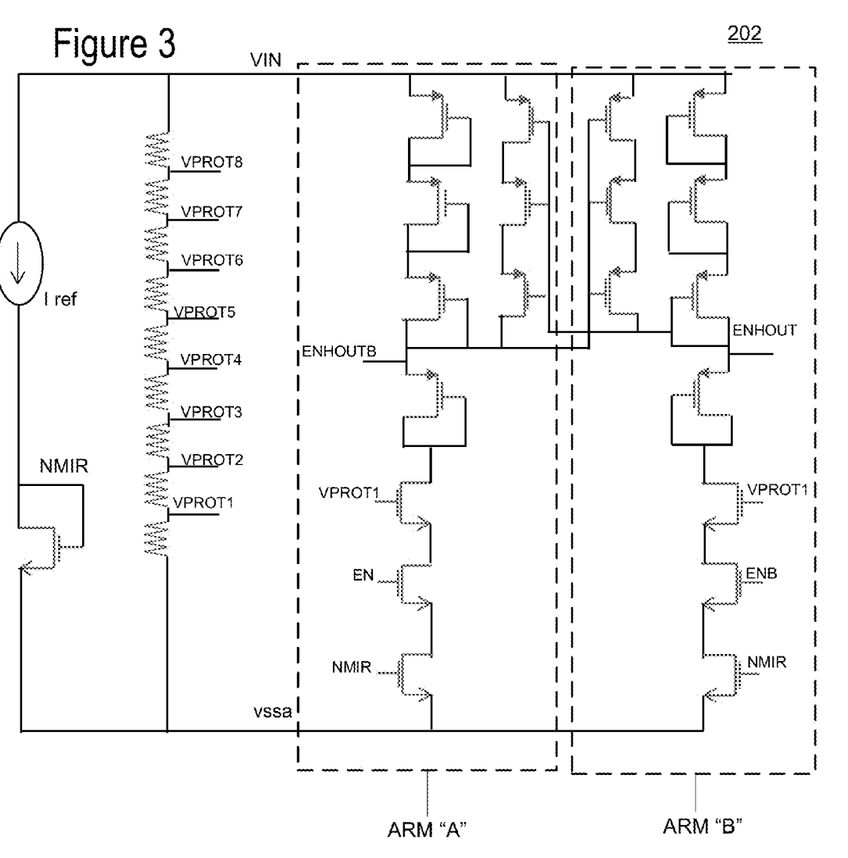
FIG. 3 is a level shifter with high voltage protection.

FIG. 3 is a level shifter with high voltage protection. FIG. 3 illustrates one embodiment for implementing the control inputs for the resistive ladder switches S1-S8 shown in FIG. 2. When the level shifter is active, any one of its arms (ARM A or ARM B) may consume constant DC current. Both ARM A and ARM B have voltages lower than maximum allowed operational voltage for the devices for each arm. ARM A or ARM B is a diode arm with a 3 diode structure near the top of ARM A or ARM B. The right side of ARM A or left side of ARM B may be referred to as the switch arm. There is an enable signal EN in ARM A and ENB in ARM B. The outputs ENHOUT and ENHOUTB are high level shifted signals of EN and ENB respectively.

Figure 4:
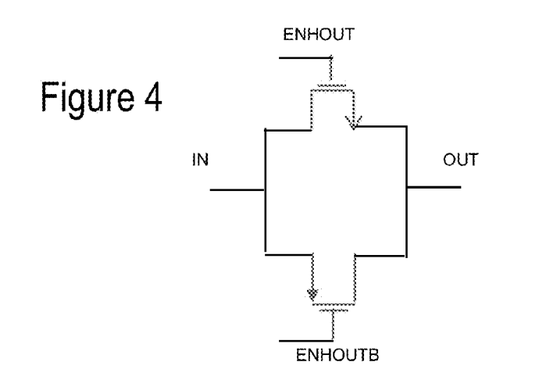
FIG. 4 is an exemplary implementation of resistor ladder switch using outputs of level shifter of FIG. 3.

FIG. 4 is an exemplary implementation of resistor ladder switch using a pass transistor controlled by level shifter output signals. The pass MOS devices from FIG. 2 are simplified with multiple outputs. The input IN and output OUT are shown along with the enabled outputs ENHOUT and ENHOUTB of level shifter.

Figure 5:
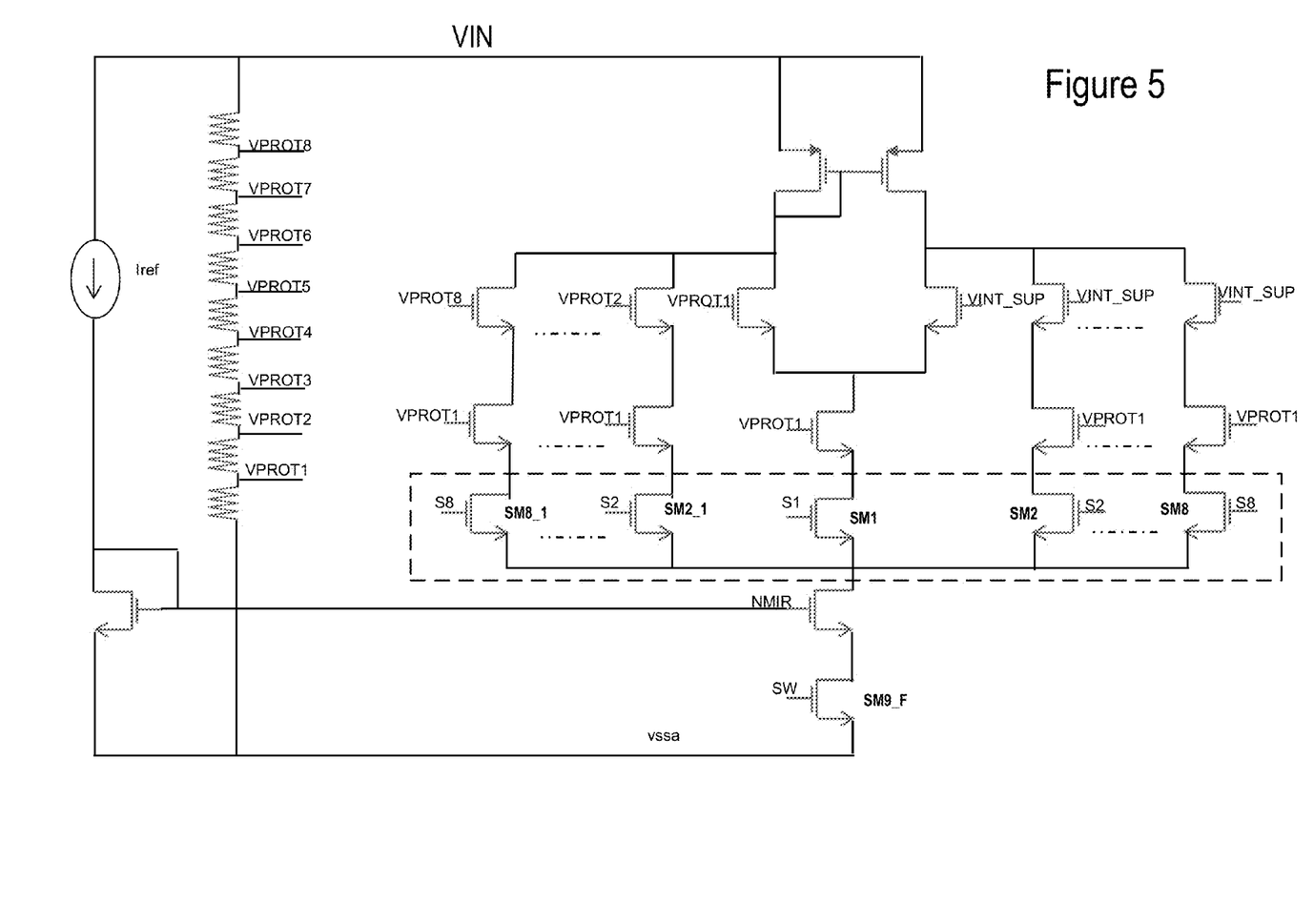
FIG. 5 is an amplifier with level switching.

FIG. 5 is an amplifier with level switching. In this mechanism the differentional pair arms of the "CTRL_AMP" amplifier are switched with switches "SM1" to "SM8" and "SM2_1" to "SM8_1". With this mechanism level shifters of FIG. 3 are not required and stand-by current is reduced. Initially while Vin is ramping up, the VPROT1 signal goes to the amplifier as a reference voltage. The switching progressively continues through VPROT1-8. There is a mirror NMIR and switch SW or SM9_F, which shuts off the process when complete. The mirror and switches should not see a voltage higher than the operational voltage. The output node is VINT_SUP, which is the intermediate supply voltage in FIG. 1. Once start-up mechanism is complete, the amplifier "CTRL_AMP" is "switched off" with "SM9_F" and "cascode or protection device bias arm" remains active for controlling the protection cascode power device PM1 as in FIG. 1.

FIG. 6 is a graphical illustration of the controlled input voltage. The top graph illustrates the input voltage VIN over time. In particular, the voltage supply is ramped up initially to the value of 3.7 V. The top graph illustrates that the voltage ramps to 3.7V quickly. As a result of the controlled startup mechanism discussed above, the lower graph illustrates that the VINT_SUP voltage value is ramped much more slowly over time in a well-controlled fashion. The value of VINT_SUP may start around 1.85V and gradually step up to the value of VIN. In one particular example, every 10 uS the switches are changed from S1 to S8 and this varies voltage at VINT_SUP in steps of approximately 200 millivolts (mV) as shown in FIG. 6. Gradually over time, the VINT_SUP value is increased by 200 mV as the switches are opened/closed. Even at different process and temperature corners, a fast input supply VIN will be ramped with slower VINT_SUP.

Non-volatile memory is one example of a device that may utilize voltage regulation as described above. For example, the controlled start-up voltage regulator in FIGS. 1-5 may be utilized in a flash memory card. A flash memory system which may utilize the controlled start-up voltage regulation is shown in FIGS. 7-8. Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards may have a unique mechanical and/or electrical interface according to its standardized specifications, the flash memory system included in each may be similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

A host system 700 of FIG. 7 stores data into and retrieves data from a flash memory 702. The flash memory may be embedded within the host, such as in the form of a solid state disk (SSD) drive installed in a personal computer. Alternatively, the memory 702 may be in the form of a flash memory card that is removably connected to the host through mating parts 704 and 706 of a mechanical and electrical connector as illustrated in FIG. 7. A flash memory configured for use as an internal or embedded SSD drive may look similar to the schematic of FIG. 7, with one difference being the location of the memory system 702 internal to the host. SSD drives may be in the form of discrete modules that are drop-in replacements for rotating magnetic disk drives.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip.

The host system 700 of FIG. 7 may be viewed as having two major parts, insofar as the memory 702 is concerned, made up of a combination of circuitry and software. They are an applications portion 708 and a driver portion 710 that interfaces with the memory 702. There may be a central processing unit (CPU) 712 implemented in circuitry and a host file system 714 implemented in hardware. In a PC, for example, the applications portion 708 may include a processor 712 running word processing, graphics, control or other popular application software. In a camera, cellular telephone or other host system 714 that is primarily dedicated to performing a single set of functions, the applications portion 708 includes the software that operates the camera to take and store pictures, the cellular telephone to make and receive calls, and the like.

The memory system 702 of FIG. 7 may include non-volatile memory, such as flash memory 716, and a system controller 718 that both interfaces with the host 700 to which the memory system 702 is connected for passing data back and forth and controls the memory 716. The system controller 718 may convert between logical addresses of data used by the host 700 and physical addresses of the flash memory 716 during data programming and reading. Functionally, the system controller 718 may include a front end 722 that interfaces with the host system, controller logic 724 for coordinating operation of the memory 716, flash management logic 726 for internal memory management operations such as garbage collection, and one or more flash interface modules (FIMs) 728 to provide a communication interface between the controller with the flash memory 716.

FIG. 8 illustrates a controller integrated circuit chip that is the system controller 718. In particular, the system controller 718 may be implemented on a single integrated circuit chip, such as an application specific integrated circuit (ASIC) such as shown in FIG. 8. The processor 806 of the system controller 718 may be configured as a multi-thread processor capable of communicating via a memory interface 804 having I/O ports for each memory bank in the flash memory 716. The system controller 718 may include an internal clock 818. Alternatively, the host may transmit a clock signal through a host interface 816 to the system controller 718. The host interface 816 may transmit and/or receive data signals to/from the host. The processor 806 communicates with an error correction code (ECC) module 814, a RAM buffer 812, the host interface 816, and ROM 810 via an internal data bus 802. The ROM 810 may be used to initialize a memory system 702, such as a flash memory device. The memory system 702 that is initialized may be referred to as a card. The ROM 810 may be a region of read only memory whose purpose is to provide boot code to the RAM for processing a program, such as the initialization and booting of the memory system 702. The ROM may be present in the ASIC rather than the flash memory chip.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A circuit with a linear voltage regulator that generates a regulated voltage from a high input voltage, the circuit comprising:
    a plurality of devices limited to at least one operational voltage, wherein the high input voltage exceeds the at least one operational voltage and the regulated voltage is at or below the at least one operational voltage;
    a startup mechanism for implementing a startup process that slowly ramps an intermediate voltage to avoid a sudden voltage spike of the high input voltage during the startup process before the high input voltage is settled, the startup mechanism comprising:
        a plurality of switches;
        a resistor divider with one resistor that corresponds with each of the switches; and
        a control amplifier; and
    a protection device bias arm comprises devices corresponding to the plurality of devices that generate a bias voltage for the plurality of devices, wherein the protection device bias arm controls a sudden voltage spike of the high input voltage after the startup process and after the high input voltage is settled.

2. The circuit of claim 1 wherein the resistor divider comprises a plurality of resistors that each correspond with one or more of the switches.

3. The circuit of claim 1 wherein the switches are individually switched to slowly ramp the intermediate voltage.

4. The circuit of claim 1 wherein the linear voltage regulator maintains the regulated voltage within the circuit.

5. The circuit of claim 1 wherein the startup mechanism comprises eight switches and corresponding resistors from the resistor divider.

6. The circuit of claim 5 wherein a resistance for a first eight of the resistors is a total resistance of the resistors divided by sixteen and a resistance for a last of the resistors is the total resistance divided by two.

7. The circuit of claim 1 wherein the at least one operational voltage comprises an operational voltage corresponding with each of the devices and the regulated voltage is at or below a lowest of those operational voltages.

8. A linear voltage regulator comprising:
    circuitry for receiving an input voltage and regulating an output voltage, the circuitry comprising:
        a plurality of devices limited to an operational voltage; and
        a protection device bias arm comprises devices corresponding to the plurality of devices that generate a bias voltage for the plurality of devices after a startup process is completed to avoid a sudden voltage spike of the input voltage; and
    a startup mechanism for controlling voltage during the startup process, the startup mechanism comprising:
        a resistor ladder comprising a plurality of resistors;
        a plurality of resistive ladder switches corresponding with each of the resistors; and
        a control amplifier;
    wherein the startup mechanism gradually ramps an intermediate voltage during the startup process to protect the devices from being exposed to a voltage above the operational voltage.

9. The linear voltage regulator of claim 8 wherein the devices each have a different operational voltage and the operational voltage that is limited for the devices is a lowest operational voltage of any of the devices.

10. The linear voltage regulator of claim 8 wherein there is a corresponding resistor for each of the switches in the resistive ladder switches.

11. The linear voltage regulator of claim 10 wherein the switches are individually switched to slowly ramp the intermediate voltage at startup.

12. The linear voltage regulator of claim 11 wherein the circuitry maintains a regulated voltage within the linear voltage regulator.

13. The linear voltage regulator of claim 8 wherein the startup mechanism comprises eight switches and corresponding resistors from the resistor ladder.

14. The linear voltage regulator of claim 13 wherein a resistance for a first eight resistors is a total resistance of the resistors divided by sixteen and a resistance for a last of the resistors is the total resistance divided by two.

15. The linear voltage regulator of claim 8 wherein the operational voltage can vary depending on each of the devices.

* * * * *